United States Patent
Kumagai

(10) Patent No.: US 9,740,564 B2
(45) Date of Patent: *Aug. 22, 2017

(54) INFORMATION DEVICE STORING DATA FOR SYSTEM RESTORATION

(71) Applicant: Kabushiki Kaisha Toshiba, Minato-ku, Tokyo (JP)

(72) Inventor: Akira Kumagai, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 9 days.

This patent is subject to a terminal disclaimer.

(21) Appl. No.: 14/480,165

(22) Filed: Sep. 8, 2014

(65) Prior Publication Data

US 2015/0046749 A1 Feb. 12, 2015

Related U.S. Application Data

(63) Continuation of application No. 14/160,926, filed on Jan. 22, 2014, now Pat. No. 8,862,864, which is a (Continued)

(30) Foreign Application Priority Data

Mar. 22, 2002 (JP) .................. 2002-081915

(51) Int. Cl.
*G06F 9/00* (2006.01)
*G06F 9/24* (2006.01)
(Continued)

(52) U.S. Cl.
CPC ........ *G06F 11/1438* (2013.01); *G06F 3/0619* (2013.01); *G06F 3/0647* (2013.01);
(Continued)

(58) Field of Classification Search
CPC .................................................. G06F 11/1438
See application file for complete search history.

(56) References Cited

U.S. PATENT DOCUMENTS

| | | |
|---|---|---|
| 5,469,573 A | 11/1995 | McGill, III et al. |
| 5,715,462 A | 2/1998 | Iwamoto et al. |

(Continued)

FOREIGN PATENT DOCUMENTS

JP 2000-20285 1/2000

OTHER PUBLICATIONS

Keichi IKEDA, "System Guardian," Interop Magazine, vol. No. 12, Soft Bank Publishing Company Limited, Dec. 1, 2000, pp. 110-111.
(Continued)

*Primary Examiner* — Mohammed Rehman
(74) *Attorney, Agent, or Firm* — Finnegan, Henderson, Farabow, Garrett & Dunner, L.L.P.

(57) ABSTRACT

An information device has a storage medium storing information items which includes a first program provided on a first partition, a second program and data provided on a second partition to restore the first program on the first partition to a predetermined state, a boot block which causes system activation from one of the first partition and the second partition, and an active-partition switching program which indicates, to the boot block, one of the first and second partitions. An input/output system activates the active-partition switching program when a specific operation is performed. The active-partition switching program indicates to the boot block that system activation is to be executed from the second partition.

21 Claims, 5 Drawing Sheets

Related U.S. Application Data continuation of application No. 13/709,260, filed on Dec. 10, 2012, now Pat. No. 8,683,186, which is a continuation of application No. 12/889,303, filed on Sep. 23, 2010, now Pat. No. 8,356,167, which is a continuation of application No. 12/007,652, filed on Jan. 14, 2008, now Pat. No. 7,814,306, which is a continuation of application No. 10/337,901, filed on Jan. 8, 2003, now Pat. No. 7,337,313.

(51) Int. Cl.
    *G06F 15/177*    (2006.01)
    *G06F 11/14*    (2006.01)
    *G06F 9/44*    (2006.01)
    *G06F 3/06*    (2006.01)

(52) U.S. Cl.
    CPC ............ *G06F 3/0689* (2013.01); *G06F 9/441* (2013.01); *G06F 11/1417* (2013.01); *G06F 11/1469* (2013.01)

(56) References Cited

U.S. PATENT DOCUMENTS

| | | | |
|---|---|---|---|
| 5,829,045 A * | 10/1998 | Motoyama | G06F 11/1469 711/112 |
| 5,982,892 A | 11/1999 | Hicks et al. | |
| 5,987,605 A | 11/1999 | Hill et al. | |
| 6,064,050 A | 5/2000 | Ishikawa et al. | |
| 6,195,695 B1 | 2/2001 | Cheston et al. | |
| 6,308,265 B1 | 10/2001 | Miller | |
| 6,385,721 B1 | 5/2002 | Puckette | |
| 6,430,663 B1 | 8/2002 | Ding | |
| 6,557,169 B1 | 4/2003 | Erpeldinger | |
| 6,567,793 B1 | 5/2003 | Hicks et al. | |
| 6,711,675 B1 | 3/2004 | Spiegel et al. | |
| 6,792,556 B1 | 9/2004 | Dennis | |
| 6,862,681 B2 | 3/2005 | Cheston et al. | |
| 6,880,048 B1 | 4/2005 | Lemke | |
| 6,892,304 B1 | 5/2005 | Galasso et al. | |
| 6,898,705 B2 | 5/2005 | Abboud et al. | |
| 6,901,493 B1 | 5/2005 | Maffezzoni | |
| 6,931,522 B1 | 8/2005 | Raghavan et al. | |
| 7,024,581 B1 * | 4/2006 | Wang | G06F 11/1417 713/2 |
| 7,366,888 B2 | 4/2008 | Dayan et al. | |
| 7,418,588 B2 | 8/2008 | Lin et al. | |
| 2001/0016042 A1 | 8/2001 | Cofta et al. | |
| 2002/0053044 A1 | 5/2002 | Gold et al. | |
| 2002/0059570 A1 * | 5/2002 | Yoo | G06F 8/60 717/170 |
| 2002/0184484 A1 | 12/2002 | Abboud et al. | |
| 2003/0037279 A1 | 2/2003 | Laio | |
| 2003/0172228 A1 | 9/2003 | Chu et al. | |
| 2004/0088692 A1 | 5/2004 | Stutton et al. | |
| 2005/0027995 A1 | 2/2005 | Menschik et al. | |
| 2008/0126786 A1 | 5/2008 | Kumagai | |

OTHER PUBLICATIONS

"Special Topic New Century OS, Ultimate Coexistence Orientation the 1 section Basic Compilation," Windows 2000 World, vol. 6, No. 2, (Co. Ltd.), IGD Japan, Feb. 1, 2001, pp. 136-146.

\* cited by examiner

INFORMATION DEVICE STORING DATA FOR SYSTEM RESTORATION

CROSS-REFERENCE TO RELATED APPLICATIONS

This application is a continuation of U.S. application Ser. No. 14/160,926, filed Jan. 22, 2014, which is a continuation of U.S. application Ser. No. 13/709,260, filed Sep. 10, 2012, which is a continuation of U.S. application Ser. No. 12/889,303, filed Sep. 23, 2010, which is a continuation of U.S. application Ser. No. 12/007,652, filed Jan. 14, 2008, which is a continuation of U.S. application Ser. No. 10/337,901, filed Jan. 8, 2003, which is based upon and claims the benefit of priority from the prior Japanese Patent Application No. 2002-081915, filed Mar. 22, 2002, the entire contents of all which are incorporated herein by reference.

BACKGROUND OF THE INVENTION

1. Field of the Invention

The present invention relates to an initial state restoration method of restoring a system in a storage medium of an information device to its initial state, the information device, and the storage medium.

2. Description of the Related Art

In the event that an information device, such as a personal computer, becomes disabled from being activated properly or comes to operate improperly, there arises need of restoring a system (e.g. an OS) on an internal storage medium (e.g., a hard disk drive) to its initial, state. In that event, removable media, such as CD-ROM, is generally used to restore a system on a storage medium to its initial state.

That is, a boot program (e.g., an OS) and data for restoring a system to its initial state are previously stored on the media such as CD-ROM. The information device is restored to its initial state by reading the media into the information device through its CD-ROM drive.

With the above conventional technique, however, in order to restore a system to its initial state, it is required to use removable external storage media, such as CD-ROM, which has been previously stored with data and a boot program for that purpose whenever need arise. Thus, the Fusers feel the procedure very cumbersome.

In addition, singe it is impossible to know when and where need arises to restore a system to its initial state, the users have to carry the external storage media with them all the time.

BRIEF SUMMARY OF THE INVENTION

Embodiments of the present invention provide an information device, a storage medium and an initial state restoration method, which permit restoration of an internal system to its initial state.

According to one aspect of the present invention, there is provided a storage medium which stores information items, the information items comprising a first program provided on a first partition; a second program and data provided on a second partition to restore the first program on the firsts partition to a predetermined state; a boot block which causes system activation from one of the first partition and the second partition; and an active-partition switching program which indicates, to the boot block, one of the first and second partitions.

According to another aspect of the present invention, there is provided an information device comprising a storage medium storing information items which includes a first program provided on a first partition, a second program and data provided on a second partition to restore the first program on the first partition to a predetermined state, a boot block which causes system activation from one of the first partition and the second partition, and an active-partition switching program which indicates, to the boot block, one of the first and second partitions; and an input/output system which is capable of activating the active-partition switching program when a specific operation is performed, wherein the active-partition switching program indicates to the boot block that system activation is to be executed from the second partition.

According to still another aspect of the present invention, there is provided a method of restoring a system on a storage medium in an information device to a predetermined state, the method comprising providing a first program on a first partition of the storage medium; providing a second program and data on a second partition of the storage medium to restore the first, program on the first partition to the predetermined state; providing a boot block which causes system activation from one of the first partition and the second partition; providing an active-partition switching program which indicates, to the boot block, one of the first and second partitions; causing an input/output system to activate the active-partition switching program when a specific operation is performed; and causing the active-partition switching program to indicate to the boot block that system activation is to be executed from the second partition.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the accompanied drawings.

Figure 1:
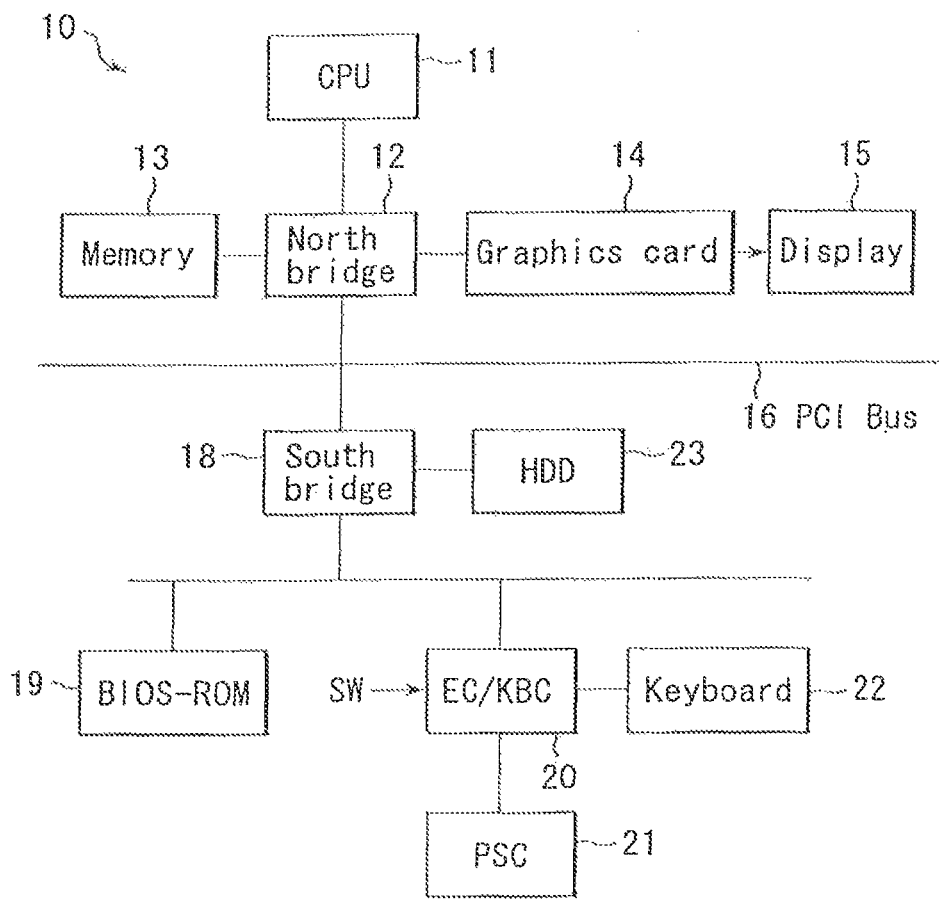
FIG. 1 is a block diagram of an information device according to an embodiment of the present invention.

FIG. 1 is a block diagram of an information device according to an embodiment of the present invention.

An information device 10 is implemented as, e.g., a portable personal computer. The information device 10 has a CPU (central processing unit) 11, north bridge 12, memory 13, graphics unit 14, display unit 15, PCI (Peripheral Component Interconnect) bus 16, south bridge 18, BIOS-ROM (Basic Input/Output System-Read Only Memory) 19, EC/KEG (Embedded Controller/KeyBoard Controller) 20, PSC (Power Supply Controller) 21, keyboard 22, HDD (Hard Disk Drive) 23, and the like.

The CPU 11 controls the operation of the entire information device. For example, the CPU 11 executes data processing with respect to another device in the information device 10 and executes various kinds of programs.

The north bridge 12 has various kinds of controllers that executes bridge processing between the CPU 11 and the south bridge 18, control of the memory 13, control of the graphics card 14, and the like.

The memory 13 is provided as the work area of the CPU 11. At the activation of the information device 10, the BIOS stored in the BIOS-ROM 19 is loaded into this memory 13 and runs under the control of the CPU 11. After the BIOS has been activated, the OS (Operating System) and various application programs are loaded into the memory 13 and operate under the control of the CPU 11.

The graphics card 14 is connected with the north bridge 12 through an AGP (Accelerated Graphics Port) to control data that is to be displayed on the display unit 15.

The display unit 15 displays various types of information in accordance with signals sent from the graphics card 14.

The PCI bus 16 is connected between the north bridge 12 and the south bridge 18. A plurality, of PCI devices can connected to the PCI bus 15.

The south bridge 18 is connected to the north bridge 12 through the PCI bus 16. The south bridge 18 is also connected to the BIOS-ROM 19 and the EC/KBC 20 through an LPC bus or the like. The south bridge 18 has various kinds of controllers to control the individual devices. The south bridge 18 also has an IDE controller that controls the HDD 23 connected through an IDE (Integrated Device Electronics) connector.

The BIOS-ROM 19 stores a BIOS that mainly executes control related to hardware at the time of activating the information device 10. The BIOS of this embodiment incorporates a logic that detects, through the EC/KBC 20, whether a specific key (for example, the numeric entry key "0") has been pressed when the power is applied to the information device 10 (i.e., when the power switch is turned on). The subsequent procedure varies according to the result of detection. These procedures will be described later.

The EC/KBC 20 is formed by integrating an EC serving as an embedded controller and a keyboard controller. The embedded controller (EC) outputs a power ON/OFF instruction to the power supply controller (PSC) 21 in accordance with the power supply state of the information device (main memory) 10 (e.g., the ON/OFF state of a power switch SW). The keyboard controller (KBC) controls the keyboard 22 connected to it.

The power supply controller (PSC) 21 ON/OFF-controls power supply necessary for each element in the information device 10 in accordance with the instruction from the embedded controller (EC).

The keyboard 22 is connected to the keyboard controller (KBC) in the EC/KBC 20 and used by the user to execute key input operation.

The HDD 23 incorporates a hard disk serving as a magnetic storing medium. The HDD 23 is connected to the south bridge 18 through an IDE connector.

Figure 2:
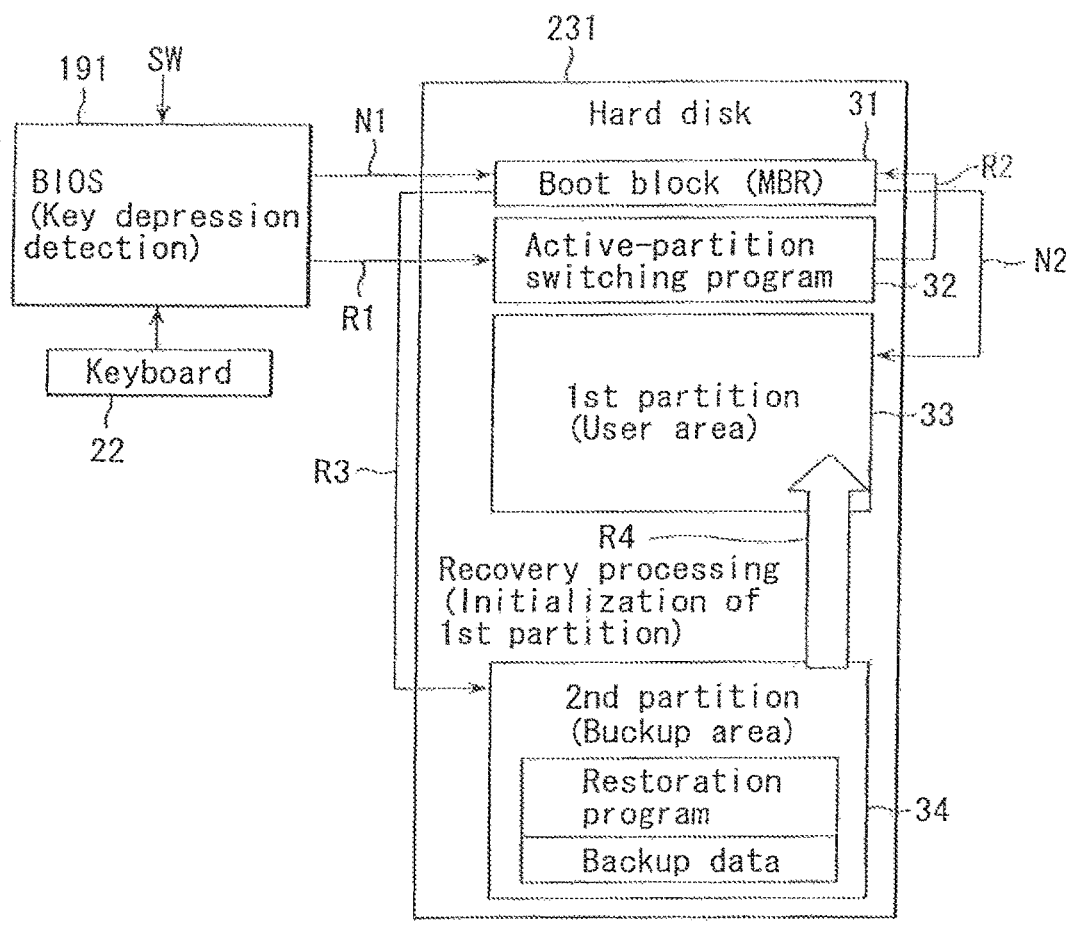
FIG. 2 is a diagram for use in explanation of the relationship between the hard disk and BIOS used in the information device of FIG. 1.

FIG. 2 is a diagram for use in explanation of the relationship between the hard disk and BIOS used in the information device of FIG. 1.

The hard disk 231 is a magnetic recording medium built in the HDD 23. The hard disk 231 is stored with a boot block 31 called a master boot record (MBR) and an active-partition switching program (hereinafter simply referred to as a switching program) 32. On the recording surface of the hard disk 231 are defined a first partition 33 that stores a system (software) which is activated in normal processing and a second partition 23 that stores a system used in recovery tor restoration) processing.

The boot block 31 is capable of, when invoked (activated) by either of the BIOS 191 and the switching program 32, recognizing the active partition (the first partition 33 or the second partition 34) referring to its own partition table (to be described later), and activating a system from that active partition.

The switching program 32 is capable of, when invoked (activated) by the BIOS 191, executing a setting process to activate a system from the second partition 34 not from the first partition 33 on the partition table of the boot block 31, and then invoking (activating) the boot block. Though one switching program 32 is shown in FIG. 2, it is allowed to copy this switching program and distribute a plurality of switching programs 32 including spare ones.

The first partition 33 corresponds to an area used by the user in normal processing, an ordinary operating system (OS) that is stored in the first partition 33 is activated.

The second partition 34 corresponds to a backup area. This partition has a recovery (or restoration) program and backup data for restoring a system on the first partition 33 to its initial state (for example, the state at the time when it is shipped) and is used in recovery (or restoration) processing.

The first partition 33 is set up as a normal partition (user-visible area), whereas the second partition 34 is set up as a normal partition or hidden partition (user-invisible area).

The BIOS 191 is one that is stored in the BIOS-ROM 19. When detecting specific key on the keyboard 22 being pressed at the same time the power is applied to the information device 10 (i.e., the power switch is turned on), the BIOS 191 invokes (activates) the switching program 32 to carry out recovery processing. If the specific key is not pressed (has not been pressed) when the power is applied to the information device 10, the BIOS invokes (activates) the boot block 31 to carry out the normal processing.

Here, the flow of the normal processing and the flow of the recovery processing will be described with reference to FIG. 2.

<Normal Processing>

N1: When the user usually turns on the power to the information device 10, the BIOS 191 is activated usually. The activated BIOS 191 executes setting process related to hardware and thereafter activates the boot block 31 as a normal operation.

N2: In the partition table of the boot block 31, the first partition 33 is normally indicated to be the active partition. Thus, the boot block 31 activated by the BIOS 191 activates-a system from the first partition 33.

<Recovery Processing>

R1: When the user turns on the power to the information device 10 while pressing the specific key on the keyboard 22 in order to make system recovery, the BIOS 191 is activated. At this time, the BIOS 191 detects the depression of the specific key at the same time the power is applied. As a result, the BIOS 191 executes setting process related to hardware and thereafter produces a predetermined signal to activate the switching program 32.

R2: The switching program 32 activated by the BIOS 191 stores setting information for system activation from the second partition 34 in the partition table of the boot block. 31 and then activates that boot block.

R3: The boot block 31 activated by the switching program 32 activates a system from the second partition 34 because the partition table indicates that system activation is to be executed from the second partition 34.

R4: The restoration program on the second partition 34 restores the system on the first partition 33 to its initial state utilizing backup data.

Figure 3:
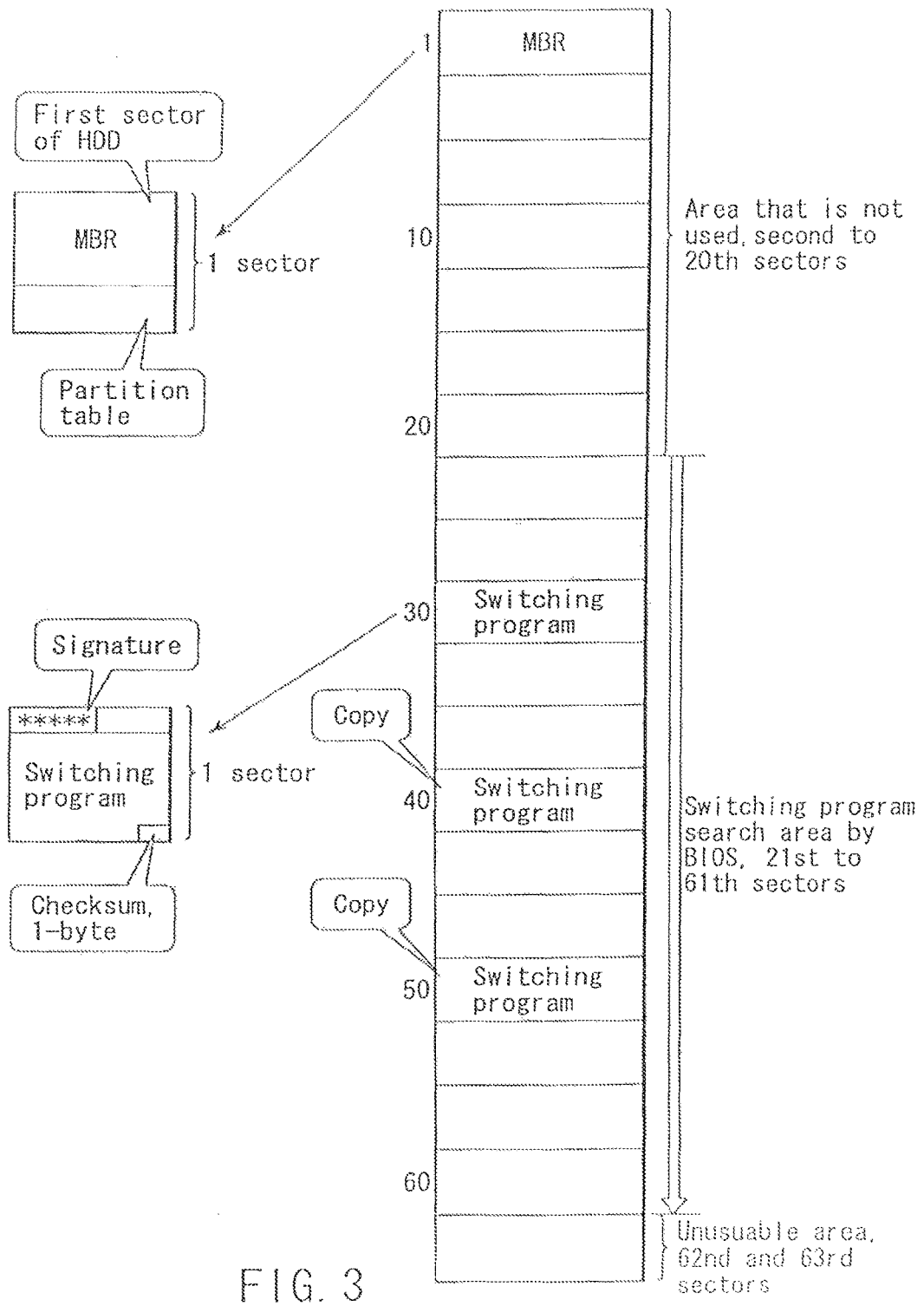
FIG. 3 is a diagram for use in explanation of the record positions of the boot block (MER) and switching programs shown in FIG. 2 on the hard disk.

FIG. 3 is a diagram for use in explanation of the record positions of the boot block (MBR) and the switching program shown in FIG. 2 on the hard disk As shown, the MBR (boot block) is recorded on the first sector (one sector) of the hard disk. The MBR on the first sector is accessed by the BIOS at the time of normal processing. The MBR contains the partition table.

The same switching programs including spare ones (one switching program for one sector) are recorded distributed between, for example, the twenty-first and sixty-first sectors. At the time of recovery processing, the BIOS makes search of the switching programs in sequence beginning with the twenty-first sector. Once one switching program is detected correctly, it is activated. Each switching program contains a signature that indicates its source and an error detecting checksum (one byte) as required.

The sector (first sector) on which the MSR is recorded is an area unavailable for other purposes. It is therefore unable to record the switching-program in this area. The second to twentieth sectors are an area which is likely to be used as a Work area used in replacing the current operating system with its latest version. If the switching program were recorded in this area, it might be erased by being overwritten with another data. Thus, this area id not to be recorded with the switching program.

Recording of the same switching program in two or more sectors as shown in FIG. 3 provides an advantage of improved reliability of recovery processing. That is, even when some switching programs become disabled from being detected due to some cause, at least one program can be detected, then proper processing will be achieved.

Figure 4:
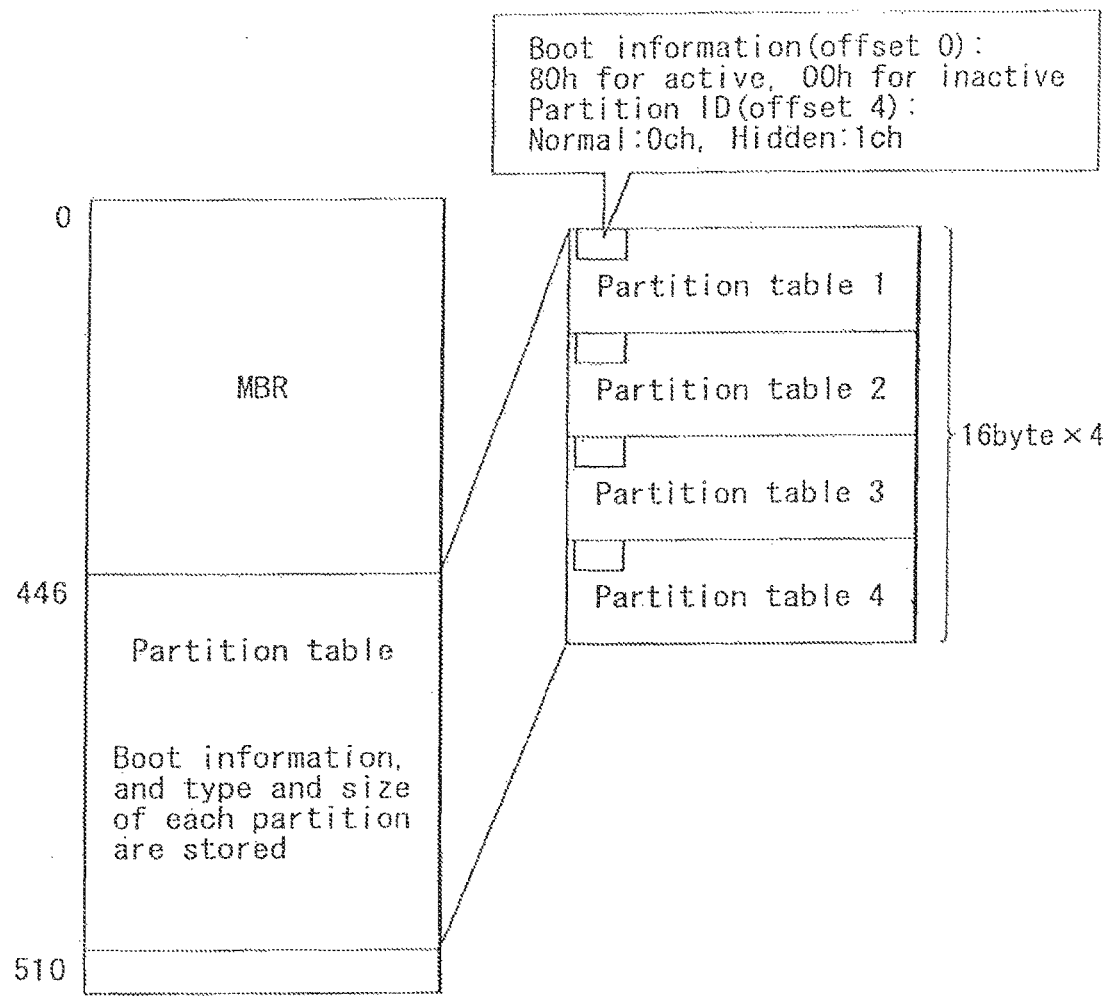
FIG. 4 is a diagram for use in explanation of the configuration of partition tables that the boot block (MBR) shown in FIGS. 2 and 3 has.

FIG. 4 is a diagram for use in explanation of the configuration of partition tables that the boot block (MBR) shown in FIGS. 2 and 3 contains.

As shown, the MBR is provided, for each individual partition defined on the hard disk, with a table that contains boot information (active/inactive), ID, type (normal/hidden), and size.

Concerning the boot information, for example, "80 h" is set for active partition and "00 h" is set for inactive partition. Concerning the type (attribute), for example, "0Ch" is set for normal partition and "1Ch" is set for hidden partition.

In FIG. 4, an area to record four partition tables 1 to 4 is reserved. In the present embodiment, however, since only two partitions are provided (See FIG. 2), only two corresponding partition tables 1 and 2 are used without using partition tables 3 and 4.

Figure 5:
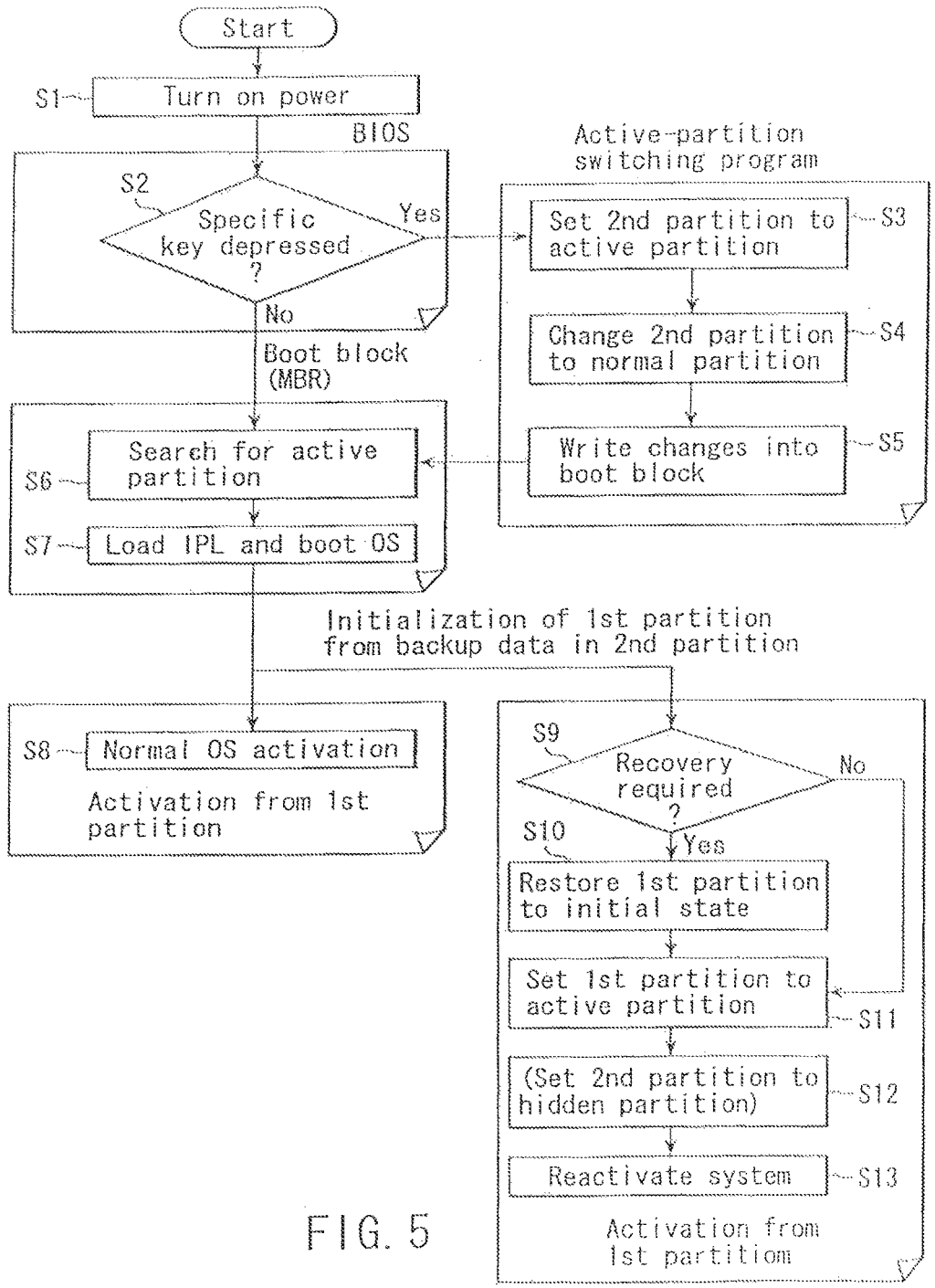
FIG. 5 is a flowchart illustrating the operation of the information device.

Next, the operation of the present embodiment will be described with reference to a flowchart of FIG. 5.

First, a determination is made by the BIOS 191 as to whether a specific key (for example, the numeric key "0") has been pressed when the power is applied to the information device (steps S1 and S2).

When the specific key has not been pressed, control is transferred to the boot block (MBR) 31. When the specific key has been pressed, on the other hand, control, is transferred to the switching program 32, and the switching program then executes the setting to change the second partition 34 to an active partition (and to change the first partition 33 to an inactive partition) (step 33), and executes the setting to change the second partition 34 to a normal partition (step S4). The settings (changes to the partitions) are retained in the partition table in the boot block 31 by the switching program 32 (step 35) and control is then transferred to the boot block (MBR) 31.

The boot block (MBR) 31 searches the partition table for an active partition (step 36) and loads an initial program loader (IPL) to boot an OS from that active partition (step S7).

In the normal processing, since the first partition 33 is set as an active partition, an OS is activated from the first partition 33 (step S8). In the recovery processing, on the other hand, since the second partition 34 is set as an active partition, the restoration program in the second partition 34 is activated.

The restoration program asks the user through the display unit 15 to confirm that he or she wants to recover (initialize) the first partition 33 (step S9) and then, if he or she wants, restores the system on the first partition 33 to its initial state using backup data (step S10).

After the system on the first partition 33 has been restored to its initial state in step 310 (or when recovery (initialization) is not performed in step S9), the restoration program returns the first partition 33 to the active partition (and returns the second partition 34 to the inactive partition) (step S11), and returns the second partition 34 to the hidden partition (step S12) These changes to the partitions are reflected in the partition table in the boot block 31 by the restoration program and the system is reactivated (step S13). At this time, since the first partition 33 has been returned to the active partition state, the normal OS will be activated after system reactivation.

The processing in step 10 and the processing in steps S11 and S12 may be interchanged.

The present embodiment provides the following advantages:

(1) Since a program and backup data for restoring a system on the first partition to its initial state are stored on a hard disk, the system can be restored to its initial state without using removable external storage media such as CD-ROM (2) Since a program and backup data, for restoring a system on the first partition to its initial state are stored on a hard disk, the system can be restored to its initial state anytime and anywhere without carrying removable external storage media such as CD-ROM.

(3) An ordinary boot block complying with an OS can be used since the active-partition switching program is stored in an area different from the boot block. In addition, the same switching program can be used even if the type of OS is changed.

(4) Since the active-partition switching program is stored in an area different from the boot block, there occurs no problem even if the boot block is changed by update of the OS.

(5) Since an ordinary boot block complying with an OS can be used, it will not be detected in error by an anti-virus program.

(6) Since the pressing of the specific key is detected by the BIOS and the like, not using the ordinary boot block complying With the OS, modification for such detection is not needed to the boot block.

The present invention is not limited to the embodiment described above. For example, although the embodiment uses a personal computer as an example of an information device, this is not restrictive. When cellular phones including the Personal Handyphone System (PHS) and personal digital assistants (PDAs) become enabled to incorporate a writable storage medium, such as a hard disk, that can store a system such as an OS, the present invention will be applicable to these cellular phones, etc. In particular, by applying the present invention to an information device, such as cellular phones, PDAs, etc., which are easy for users to use while carrying, an advantages arises in that the system can be restored to its normal state anytime and anywhere.

According to the present invention, it is Possible to restore an internal system to its initial state without using external storage media such as CD-ROM.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims, and their equivalents.

What is claimed is:

1. A computer comprising:
a processor;
an input device;
a hard disk drive (HDD) comprising a hard disk, the hard disk comprising a first partition, a second partition, and a boot block storage area,
the HDD storing, in the first partition, an operating system (OS) to be executed by the processor,
the HDD storing, in the second partition, data used for restoring the OS to an initial state at a time when the computer is shipped, and restoration software to execute processing to restore the OS to the initial state by using the data, and
the HDD storing, in the boot block storage area, a boot block having information indicating which partition is active; and
a storage section storing a switching program that is activated when a specific instruction for system recovery to restore the OS to the initial state is detected, wherein when the switching program is activated, the switching program changes the information of the boot block in the boot block storage area so that the second partition becomes an active partition instead of the first partition, and activates the boot block after the change of the information of the boot block, and wherein when the boot block is activated by the switching program, the boot block activates the restoration software in the second partition based on the changed information.

2. The computer according to claim 1, wherein the storage section storing the switching program is provided in a storage area which is different from the second partition.

3. The computer according to claim 1, wherein the storage section further stores a copy of the switching program.

4. The computer according to claim 1, wherein the information of the boot block is changeable so that system activation is executed from the second partition.

5. The computer according to claim 1, wherein after having restored the OS for system recovery, the information of the boot block is changeable so that the first partition becomes the active partition instead of the second partition.

6. The computer according to claim 1, wherein the switching program comprises an error checksum.

7. A computer comprising:
a processor;
an input device;
a hard disk drive (HDD) comprising a hard disk, the hard disk comprising a first partition, a second partition, a boot block storage area, and a storage section,
the HDD storing, in the first partition, an operating system (OS) to be executed by the processor,
the HDD storing, in the second partition, data used for restoring the OS to an initial state at a time when the computer is shipped, and restoration software to execute processing to restore the OS to the initial state by using the data;
the HDD storing, in the boot block storage area, a boot block having information indicating which partition is active; and
the HDD storing, in the storage section, a switching program that is activated when a specific instruction for system recovery to restore the OS to the initial state is detected, wherein when the switching program is activated, the switching program changes the information of the boot block in the boot block storage area so that the second partition becomes an active partition instead of the first partition, and activates the boot block after the change of the information of the boot block, and wherein when the boot block is activated by the switching program, the boot block activates the restoration software in the second partition based on the changed information.

8. The computer according to claim 7, wherein the storage section further stores a copy of the switching program.

9. The computer according to claim 7, wherein the switching program comprises an error checksum.

10. A computer comprising:
a processor;
an input device;
a storage device comprising a first partition, a second partition, and a boot block storage area,
the storage device storing, in the first partition, an operating system (OS) to be executed by the processor,
the storage device storing, in the second partition, data used for restoring the OS to an initial state at a time when the computer is shipped, and restoration software to execute processing to restore the OS to the initial state by using the data, and
the storage device storing, in the boot block storage area, a boot block having information indicating which partition is active; and
a storage section storing a switching program that is activated when a specific instruction for system recovery to restore the OS to the initial state is detected, wherein when the switching program is activated, the switching program changes the information of the boot block in the boot block storage area so that the second partition becomes an active partition instead of the first partition, and activates the boot block after the change of the information of the boot block, and wherein when the boot block is activated by the switching program, the boot block activates the restoration software in the second partition based on the changed information.

11. The computer according to claim 10, wherein the storage section storing the switching program is provided in a storage area which is different from the second partition.

12. The computer according to claim 10, wherein the storage section further stores a copy of the switching program.

13. The computer according to claim 10, wherein the information of the boot block is changeable so that system activation is executed from the second partition.

14. The computer according to claim 10, wherein after having restored the OS for system recovery, the information of the boot block is changeable so that the first partition becomes the active partition instead of the second partition.

15. The computer according to claim 10, wherein the switching program comprises an error checksum.

16. A computer comprising:
a processor;
an input device;
a storage device comprising a first partition and a second partition, a boot block storage area, and a storage section,
the storage device storing, in the first partition, an operating system (OS) to be executed by the processor,
the storage device storing, in the second partition, data used for restoring the OS to an initial state at a time when the computer is shipped, and restoration software to execute processing to restore the OS to the initial state by using the data;
the storage device storing, in the boot block storage area, a boot block having information indicating which partition is active; and
the storage device storing, in the storage section, a switching program that is activated when a specific instruction for system recovery to restore the OS to the initial state is detected, wherein when the switching program is activated, the switching program changes the information of the boot block in the boot block storage area so that the second partition becomes an active partition instead of the first partition, and activates the boot block after the change of the information of the boot block, and wherein when the boot block is activated by the switching program, the boot block activates the restoration software in the second partition based on the changed information.

17. The computer according to claim 16, wherein the storage section further stores a copy of the switching program.

18. The computer according to claim 16, wherein the switching program comprises an error checksum.

19. A method of recovering software on a storage device of a computer, the storage device comprising a first partition storing an operating system (OS) to be executed by a processor, and a second partition storing data used for restoring the OS to an initial state at a time when the computer is shipped, and restoration software to execute processing to restore the OS to the initial state by using the data, and a boot block storage area storing a boot block having information indicating which partition is active, the method comprising:
activating a switching program stored in a storage section when a specific instruction for system recovery to restore the OS to the initial state is detected;
changing, by the switching program, the information of the boot block in the boot block storage area so that the second partition becomes an active partition instead of the first partition:
activating, by the switching program, the boot block after the change of the information of the boot block; and
activating, by the boot block, the restoration software in the second partition based on the changed information.

20. The method according to claim 19, wherein the storage section further stores a copy of the switching program.

21. The method according to claim 19, wherein the switching program comprises an error checksum.

* * * * *